United States Patent [19]

Commander

[11] 4,279,082
[45] Jul. 21, 1981

[54] SOLAR ASSIST AND FILTER CONSTRUCTION FOR DRYER INLET

[76] Inventor: Buck C. Commander, Rte. 11, Box 461-A, Pensacola, Fla. 32504

[21] Appl. No.: 86,577

[22] Filed: Oct. 19, 1979

[51] Int. Cl.³ ............................................. F26B 11/04
[52] U.S. Cl. .......................................... 34/82; 34/86; 34/93; 34/133; 126/429
[58] Field of Search .................... 34/86, 93, 82, 133; 126/449, 429

[56] References Cited

U.S. PATENT DOCUMENTS

| | | | |
|---|---|---|---|
| 2,529,621 | 11/1950 | Mayo | 34/93 |
| 2,873,539 | 2/1959 | Morey | 34/82 |
| 3,066,423 | 12/1962 | Solem | 34/86 |
| 3,902,474 | 9/1975 | Pyle | 126/449 |
| 4,125,222 | 11/1978 | Briscoe | 126/429 |

Primary Examiner—Larry I. Schwartz
Attorney, Agent, or Firm—Harvey B. Jacobson

[57] ABSTRACT

An air inlet construction for a domestic clothes dryer and including a pair of selectively usable air inlet ports. One of the air inlet ports opens outwardly to the area immediately adjacent and exterior of the dryer and the other inlet port opens into the interior of a non-domestically heated portion of the building in which the dryer is disposed, but which portion is subject to being heated by solar energy during the daylight hours.

2 Claims, 3 Drawing Figures

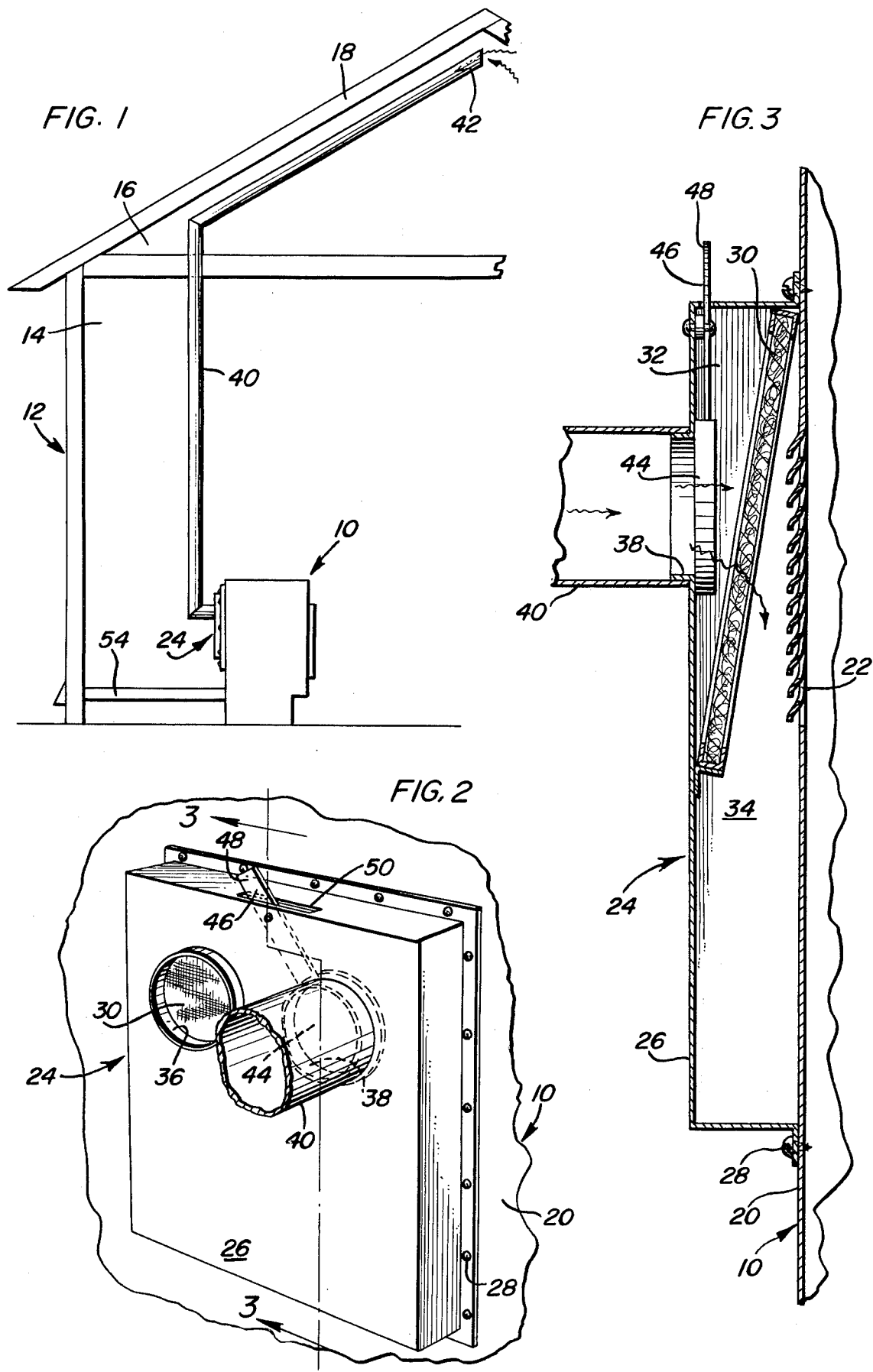

SOLAR ASSIST AND FILTER CONSTRUCTION FOR DRYER INLET

BACKGROUND OF THE INVENTION

Domestic and commercial clothes dryers utilize considerable volumes of drying air. In most instances, the air supplied to dryers of this type is taken directly from the interior of the buildings in which the dryers are disposed. Further, the air being discharged from commercial and domestic dryers is conventionally exhausted to the exterior of the associated buildings. Thus, the operation of a dryer, either domestic or commercial, typically results in a reasonably large quantity of air being exhausted from the building in which the dryer is housed with the result that exterior air must be admitted into the interior of the building to place the air pumpted therefrom by the dryer. If the weather if cold considerable heat loss is experienced by the dryer exhausting interior air to the exterior of the associated building.

Accordingly, a need exists for an improved domestic and commercial dryer air intake installation which will reduce the amount of energy required as a result of operation of a dryer during cold weather.

Examples various forms of dryer air handling structures including some of the general structural and operational features of the instant invention are disclosed in U.S. Pat. Nos. 3,066,423, 3,859,735 4,034,482, 4,099,338 and 4,142,679.

BRIEF DESCRIPTION OF THE INVENTION

The dryer air inlet construction of the instant invention comprises an air manifold or plenum including an air outlet opening into an associated dryer and a pair of selectively usable air inlets. One of the air inlets opens to the immediately adjacent air exteriorly of the dryer and the other air inlet opens into the interior of a non-domestically heated portion of the associated building construction subject to heating by solar energy during the daylight hours. The plenum may be readily attached to the rear of a conventional dryer over the dryer air inlet and may be equipped with an elongated flexible conduit, if desired, whereby the air from the non-domestically heated building interior portion subject to heating by solar energy may be ducted to the plenum.

The main object of this invention is to provide a dryer air inlet construction which will be capable of effectively reducing energy requirements of operation of a domestic or commercial dryer during the daylight hours in cold weather.

Another object of this invention is to provide a dryer air inlet construction which will allow a domestic dryer to be operated independent of air having to be drawn into the living area of a domestic building in order to replace air exhausted from the dryer exteriorly of the building.

Yet another important object of this invention is to provide a dryer inlet construction which will reduce the load on a domestic heating or cooling unit during operation of the dryer during cold and hot weather, respectively.

Still another object of this invention is to provide a dryer air inlet including an air filter whereby air drawn into the dryer will be filtered.

Yet another object of this invention is to provide a dryer inlet construction in accordance with the immediately preceding objects, but which may also be utilized to assist in air circulation into and from the interior of a domestic building during mild weather.

Another very important object of this invention is to provide a dryer inlet construction which will assist in promoting air circulation through non-domestically heated portion of the interior of an associated building structure.

A final object of this invention to be specifically enumerated herein is to provide a dryer inlet in accordance with the preceding objects and which will conform to conventional forms of manufacture, be of simple construction and easy to use so as to provide a device which will be economically, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a schematic view illustrating a typical installation of the dryer inlet construction of the instant invention;

FIG. 2 is a perspective view of the housing portion of the instant invention and illustrating the manner in which the housing portion may be operatively associated with a domestic dryer; and FIG. 3 is an enlarged fragmentary vertical sectional view taken substantially upon the plane indicated by the section line 3—3 of FIG. 2.

DETAILED DESCRIPTION OF THE INVENTION

Referring now more specifically to the drawings, the numeral 10 generally designates a conventional form of domestic dryer enclosed within a domestic building 12 including a domestically heated interior portion 14 as well as a non-heated interior portion 16 immediately beneath the roof 18 of the building 12.

The dryer 10 includes a rear panel 20 having a conventional louvered air inlet 22 formed therein and the air inlet construction of the instant invention is referred to in general by the reference numeral 24. The air inlet construction 24 includes an open sided manifold housing 26 secured over the rear panel 20 by fasteners 28 and in position enclosing the inlet 22. The housing 26 includes a replaceable air filter panel 30 removably supported therein and the air filter panel 30 divides the interior of the housing 26 into first and second compartments 32 and 34. The inlet 22 opens into the compartment 34 and the housing 26 includes a pair of horizontally spaced air inlets 36 and 38 which open into the compartment 32 (the inlets 36 and 38 may be positioned in different locations on the housing 26). The air inlet 36 opens to the immediately adjacent exterior of the housing 26 and the inlet 38 has the discharge end of a duct 40 secured thereover. The duct 40 extends into the interior portion 16 and includes an inlet end 42 which opens into the uppermost portion of the interior portion 16.

The housing 26 includes an oscillatable valve disk 44 supported on a pivotally mounted lever 46, and the lever 46 includes an end 48 remote from the disk 44 disposed exteriorly of the housing 26 and slidingly received through a slot 50 formed in the top wall of the housing 26. Accordingly, the lever 46 may be oscillated in order to shift the disk 44 between positions in registry with the inner ends of the inlets 36 and 38. Of course, when the disk 44 is registered with the inlet 36, air is drawn into the housing 26 26 through the inlet 38 and when the disk 44 is registered with the inlet 38, air is drawn into housing 26 through the inlet 36.

The air filter panel 30 filters all air passing through the housing 26 to the inlet 22 of the dryer 10 and during sunny cold weather, the disk 44 may be registered with the inlet 36 in order that solar heated air within the interior portion 16 of the building 12 may be drawn into the dryer 10. This, of course, will require less energy to obtain the desired temperature of air flowing through the dryer 10 and will also prevent cold air from being drawn into the interior of the portion 14 to replace air discharged from the dryer 10 to the exterior of the building 12 through the dryer outlet 54. Also, air may be drawn from the interior portion 16 into the dryer 10 during extremely hot weather in order to prevent warm air from the exterior of the building 12 from being drawn in to the interior portion 14. However, during mild weather the disk 44 may be registered with the inlet 38 in order that air from the interior portion may be drawn to the dryer 10. This, of course, will assist in ventilation of the interior portion 14. Likewise, during extremely hot and extremely cold weather when air is supplied to the dryer 10 from the interior portion 16, ventilation of the interior portion 16 will be assisted.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a building having a first closed interior portion to be heated and/or cooled relative to the exterior of said building and a second interior portion vented to the exterior of the building and subject to heating through direct or indirect solar energy heating thereof, a dryer disposed in said first interior portion and including an air inlet and an air outlet, said air outlet being ducted to the exterior of said building, an air inlet manifold for said air inlet and including a pair of intake air openings, valve means for selectively inversely opening and closing said intake openings, one of said air intake openings opening into said first interior portion and air passage means communicating the other air intake opening with said second interior portion, said dryer including one wall thereof through which said air inlet opens, said manifold including an open sided housing secured over the exterior surface of said one wall of said dryer through which said air inlet opens, said housing including an interior air filter panel dividing the interior of said housing into first and second compartments, said inlet opening into said second compartment and said pair of intake openings opening into said first compartment, said panel comprising means for filtering air entering said first compartment and passing through said panel into said second compartment.

2. The combination of claim 1 wherein said valve means includes a single valve member shiftable between positions alternately registered with and closing said intake air openings.

* * * * *